United States Patent
Cyrus et al.

(10) Patent No.: US 11,854,178 B2
(45) Date of Patent: *Dec. 26, 2023

(54) PHOTOGRAPHY SESSION ASSISTANT

(71) Applicant: Shutterfly, LLC, Roseville, MN (US)

(72) Inventors: Leo Cyrus, Eden Prairie, MN (US); Keith Benson, Eden Prairie, MN (US)

(73) Assignee: Shutterfly, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/070,729

(22) Filed: Oct. 14, 2020

(65) Prior Publication Data

US 2021/0027451 A1    Jan. 28, 2021

Related U.S. Application Data

(63) Continuation of application No. 16/386,918, filed on Apr. 17, 2019, now Pat. No. 10,839,502.

(51) Int. Cl.
| | | |
|---|---|---|
| *G06T 7/00* | (2017.01) | |
| *G06F 3/0482* | (2013.01) | |
| *H04N 5/222* | (2006.01) | |
| *G06V 40/10* | (2022.01) | |
| *G06V 40/16* | (2022.01) | |

(52) U.S. Cl.
CPC .......... *G06T 7/0002* (2013.01); *G06F 3/0482* (2013.01); *G06V 40/103* (2022.01); *G06V 40/175* (2022.01); *H04N 5/222* (2013.01); *G06T 2207/30168* (2013.01); *G06T 2207/30201* (2013.01)

(58) Field of Classification Search
CPC ......... G06T 7/0002; G06T 2207/30168; G06T 2207/30201; G06F 3/0482; G06F 3/04842; G06F 3/04845; G06F 3/04847; G06F 3/0488; G06V 40/103; G06V 40/175; G06V 40/171; G06V 40/174; H04N 5/222
See application file for complete search history.

(56) References Cited

U.S. PATENT DOCUMENTS

| | | | |
|---|---|---|---|
| 6,606,117 B1 * | 8/2003 | Windle ................ | H04N 23/64 348/222.1 |
| 8,320,641 B2 | 11/2012 | Steinberg et al. | |
| 8,340,452 B2 | 12/2012 | Marchesotti | |
| 8,537,230 B2 * | 9/2013 | Tsuji .................... | H04N 23/64 348/222.1 |

(Continued)

*Primary Examiner* — Hien L Duong
(74) *Attorney, Agent, or Firm* — Merchant & Gould P.C.

(57) ABSTRACT

Devices and methods for evaluating at least one photograph during a photography session are described. In some instances, a camera may be used to capture images during a photography session and a computing device may be used to identify a portrait order specification for the photography session including a set of required photographs, each having associated required criteria. The computing device may evaluate the images and determine whether the images can be associated with any of the required photographs based on features included in the images being associated with the required criteria of the required photographs. The images associated with required photographs may be displayed, and a determination of whether the images qualify as a required photograph may be made using a graphical user interface, or may be made automatically.

19 Claims, 12 Drawing Sheets

(56) References Cited

U.S. PATENT DOCUMENTS

| | | | |
|---|---|---|---|
| 8,917,326 B2 * | 12/2014 | Gotoh | H04N 23/64 |
| | | | 348/207.1 |
| 9,008,436 B2 | 4/2015 | Ptucha | |
| 9,106,821 B1 * | 8/2015 | Baldwin | G06T 7/74 |
| 9,552,374 B2 | 1/2017 | Ptucha et al. | |
| 9,866,748 B2 | 1/2018 | Sivan | |
| 10,062,173 B1 | 8/2018 | Padfield | |
| 10,091,414 B2 * | 10/2018 | Chan | H04N 23/63 |
| 10,136,052 B2 | 11/2018 | Garcia Morate et al. | |
| 10,264,177 B2 | 4/2019 | Chan et al. | |
| 10,348,948 B2 | 7/2019 | Baym et al. | |
| 10,477,184 B2 | 11/2019 | Surma et al. | |
| 10,679,041 B2 | 6/2020 | Cyrus | |
| 10,839,502 B2 | 11/2020 | Cyrus | |
| 11,123,041 B2 | 9/2021 | Ryu et al. | |
| 2006/0147107 A1 | 7/2006 | Zhang et al. | |
| 2008/0136919 A1 * | 6/2008 | Tsuji | H04N 23/64 |
| | | | 348/207.99 |
| 2009/0231457 A1 * | 9/2009 | Lee | H04N 23/631 |
| | | | 348/222.1 |
| 2009/0232409 A1 * | 9/2009 | Marchesotti | G06T 7/0002 |
| | | | 382/254 |
| 2011/0029562 A1 | 2/2011 | Whitby et al. | |
| 2011/0157221 A1 | 6/2011 | Ptucha | |
| 2012/0106848 A1 | 5/2012 | Greig et al. | |
| 2013/0108171 A1 | 5/2013 | Ptucha | |
| 2013/0242036 A1 | 9/2013 | Gorzynski et al. | |
| 2014/0089816 A1 * | 3/2014 | DiPersia | G06Q 50/01 |
| | | | 715/753 |
| 2015/0235306 A1 * | 8/2015 | Sabella | G06Q 30/08 |
| | | | 705/313 |
| 2015/0244794 A1 * | 8/2015 | Poletto | H04L 67/1095 |
| | | | 715/748 |
| 2016/0050363 A1 * | 2/2016 | Stubler | G06V 40/165 |
| | | | 348/222.1 |
| 2017/0034409 A1 * | 2/2017 | Chen | G06T 7/70 |
| 2017/0105701 A1 | 4/2017 | Peleissier et al. | |
| 2017/0244909 A1 | 8/2017 | Dannen | |
| 2017/0374280 A1 * | 12/2017 | Chan | H04N 1/00183 |
| 2018/0096497 A1 | 4/2018 | Bennett | |
| 2018/0316854 A1 | 11/2018 | Chan et al. | |
| 2019/0175011 A1 | 6/2019 | Jensen et al. | |
| 2019/0250601 A1 | 8/2019 | Donahoe et al. | |
| 2019/0253614 A1 * | 8/2019 | Oleson | H04N 23/611 |
| 2019/0294878 A1 * | 9/2019 | Endras | G06T 7/0004 |
| 2019/0313020 A1 | 10/2019 | Snyder | |
| 2020/0111166 A1 | 4/2020 | Kuruvilla et al. | |
| 2020/0111167 A1 | 4/2020 | Kuruvilla et al. | |
| 2020/0111201 A1 | 4/2020 | Kuruvilla et al. | |
| 2021/0056655 A1 | 2/2021 | Norimatsu | |
| 2021/0241444 A1 | 8/2021 | Benson | |

\* cited by examiner

| Portrait Order Spec Name | |
|---|---|
| Item | Criteria |
| Photo 1 | Crop<br>Facial Expression<br>Vert. / Horiz.<br>Pose |
| Photo 2 | Crop<br>Facial Expression |
| Photo 3 | Crop<br>Facial Expression<br>Pose |
| ••• | ••• |

*FIG. 5*

| Portrait Order Spec Name 250 | | | | |
|---|---|---|---|---|
| | Item 252 | Criteria 254 | Preview 262 | Image ID 264 | Rank 266 |
| ☐ 268a | 256a Photo 1 | 258a Crop, Facial Expression, Vert. / Horiz., Pose | 270a | 272a | 274a |
| ☐ 268b | 256b Photo 2 | 258b Crop, Facial Expression | 270b | 272b | 274b |
| ☐ 268c | 256c Photo 3 | 258c Crop, Facial Expression, Pose | 270c | 272c | 274b |
| ☐ 268n | 256n ••• | 258n ••• | 270n ••• | 272n ••• | 274c ••• |

*FIG. 6*

PHOTOGRAPHY SESSION ASSISTANT

CROSS REFERENCE TO RELATED APPLICATIONS

This application is a continuation of U.S. patent application Ser. No. 16/386,918, filed on Apr. 17, 2019, entitled PHOTOGRAPHY SESSION ASSISTANT, the disclosure of which is hereby incorporated by reference in its entirety. To the extent appropriate a claim of priority is made to the above-identified application.

BACKGROUND

Professional photography sessions can be performed at a professional studio, or on-site at churches, schools, etc. During a professional photography session, the photographer must manage the session in order to capture a set of images having certain requirements. The requirements can include different image cropping, facial expressions, poses, etc., to ensure that the session results in a set of images for the customer to choose from that fits the customer's desired order package. To make sure that the session results in an adequate set of images, photographers may manage the session to proceed in a specified order.

One difficulty is that, for a variety of reasons, photographers do not always follow the specified order. In addition, photographers are typically busy engaging the subject, and do not have time to carefully analyze and critique each image. Therefore, it is often difficult for the photographer to determine if a set of images taken during a photography session contains images that satisfy the requirements for all of the required photographs for the session while the session is still active and the subject, or subjects, are still present in order to capture more images if needed.

Another difficulty is that for each of the required photographs, multiple images are often taken. For example, for a particular required photograph (e.g. image cropping, pose, expression), multiple images may be taken for the photographer to determine the correct lighting and exposure settings, and also multiple images may be taken to ensure that the subject is not blinking, looking away, half-smiling, etc. As such, the set of images from the session may be quite large and include many images that do not satisfy the requirements. The large number of images can also get in the way of determining whether photographs that satisfy the requirements have been captured with the required level of quality to be considered for inclusion in an order package. In addition, the large number of images often makes it difficult and time consuming to choose the photographs to include in an order package from the set of images taken during the session.

If a session does not result in an adequate set of images to fulfill an order package at the end of a photography session, a new session, e.g. a make-up session, has to be scheduled. Scheduling a new, or make-up, session increases costs and the time burden on both the photographer and customer.

SUMMARY

In general terms, this disclosure is directed to a photography session assistant. In some embodiments, and by non-limiting example, a session assistant operates to evaluate whether images captured during a photography session can be associated with the required photographs for the photography session. The session assistant can indicate to the photographer to capture additional images for the required photographs that do not have an associated image.

One aspect is a method of evaluating at least one photograph during a photography session is disclosed. The method includes identifying a portrait order specification including required criteria for a set of required photographs from a photography session. The method further includes detecting at least one feature included in at least one image taken during the photography session, the feature associated with the required criteria of at least one required photograph of the set of required photographs. The method also includes associating the at least one image with the at least one required photograph having required criteria associated with the at least one feature included in the at least one image. The method further includes displaying the at least one image associated with the at least one required photograph. The method also includes determining that the at least one image satisfies the required criteria for the at least one required photograph.

Another aspect is a system for evaluating at least one photograph during a photography session includes a camera and a computing device including a non-transitory storage medium and one or more processors. The memory stores instructions that, when executed by the processor, cause the computing device to: identify a portrait order specification including required criteria for a set of required photographs from a photography session; detect at least one feature included in the at least one image taken during the photography session, the feature associated with the required criteria of at least one required photographs of the set of required photographs; associate the at least one image with the at least one required photograph having required criteria associated with the at least one feature included in the at least one image; display the at least one image associated with the at least one required photograph; and determine that the at least one image satisfies the required criteria for the at least one required photograph.

A further aspect is a session assistant including a graphical user interface and an evaluator is disclosed. The graphical user interface is configured to receive a selection of a photography portrait order specification and display a photography session status report, wherein the selected photography portrait order specification includes a set of required images, each required image in the set being associated with required criteria. The evaluator is configured to: detect at least one feature included in at least one image taken during the photography session, the feature associated with the required criteria of at least one required photograph of the set of required photographs; associate the at least one image with the at least one required photograph having required criteria associated with the at least one feature included in the at least one image; display the at least one image associated with the at least one required photograph; and determine that the at least one image satisfies the required criteria for the at least one required photograph.

In general, a photography session assistant, such as disclosed herein, provides the benefits of previewing images taken during a photography session and recommending images that are still needed to fulfill an order package on-site and in-session, e.g. while the photography session is still ongoing. As such, the photography session assistant of this disclosure can avoid having to schedule new sessions, e.g. make-up sessions, saving both time and cost. The photography session assistant of this disclosure can also avoid re-work of images already taken, e.g. continuing to take images for a required photograph when images that satisfy, or likely satisfy, the required criteria have already been captured, saving the time during the photography session as well as saving the customer time in choosing images for the order package.

BRIEF DESCRIPTION OF THE DRAWINGS

FIG. 5 is a schematic block diagram of an example photography portrait order specification.

FIG. 6 is a schematic block diagram of an example photography session status report.

DETAILED DESCRIPTION

Figure 1:
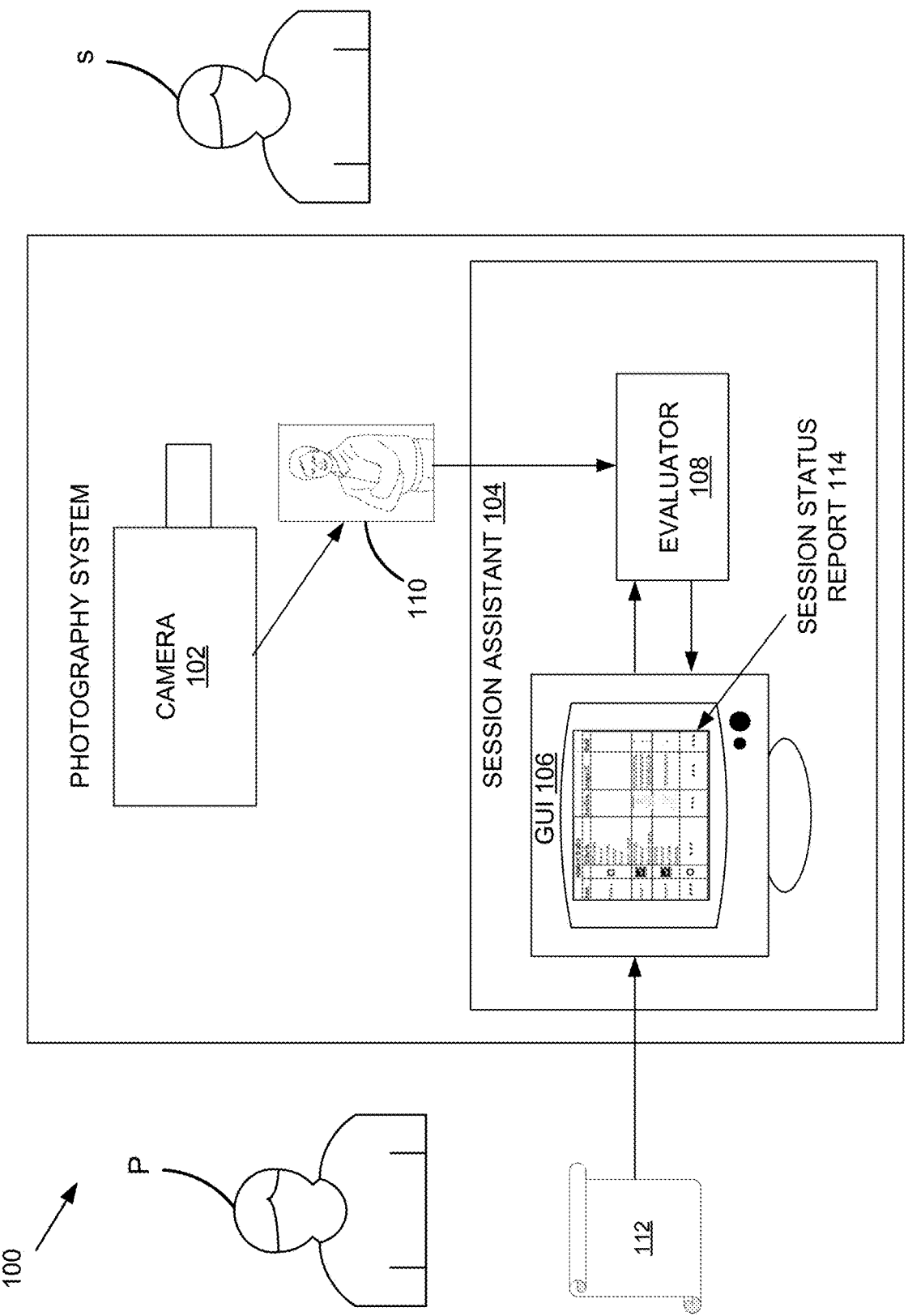
FIG. 1 is a schematic block diagram illustrating an example photography system including a session assistant.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic diagram illustrating an example photography system 100. In this example, the photography system 100 includes a camera 102 and a session assistant 104. In the example shown, the session assistant 104 includes a graphical user interface 106 and an evaluator 108. Also shown in FIG. 1 are a photographer P, a subject S, an image 110, a portrait order specification 112, and a session status report 114.

Figure 2:
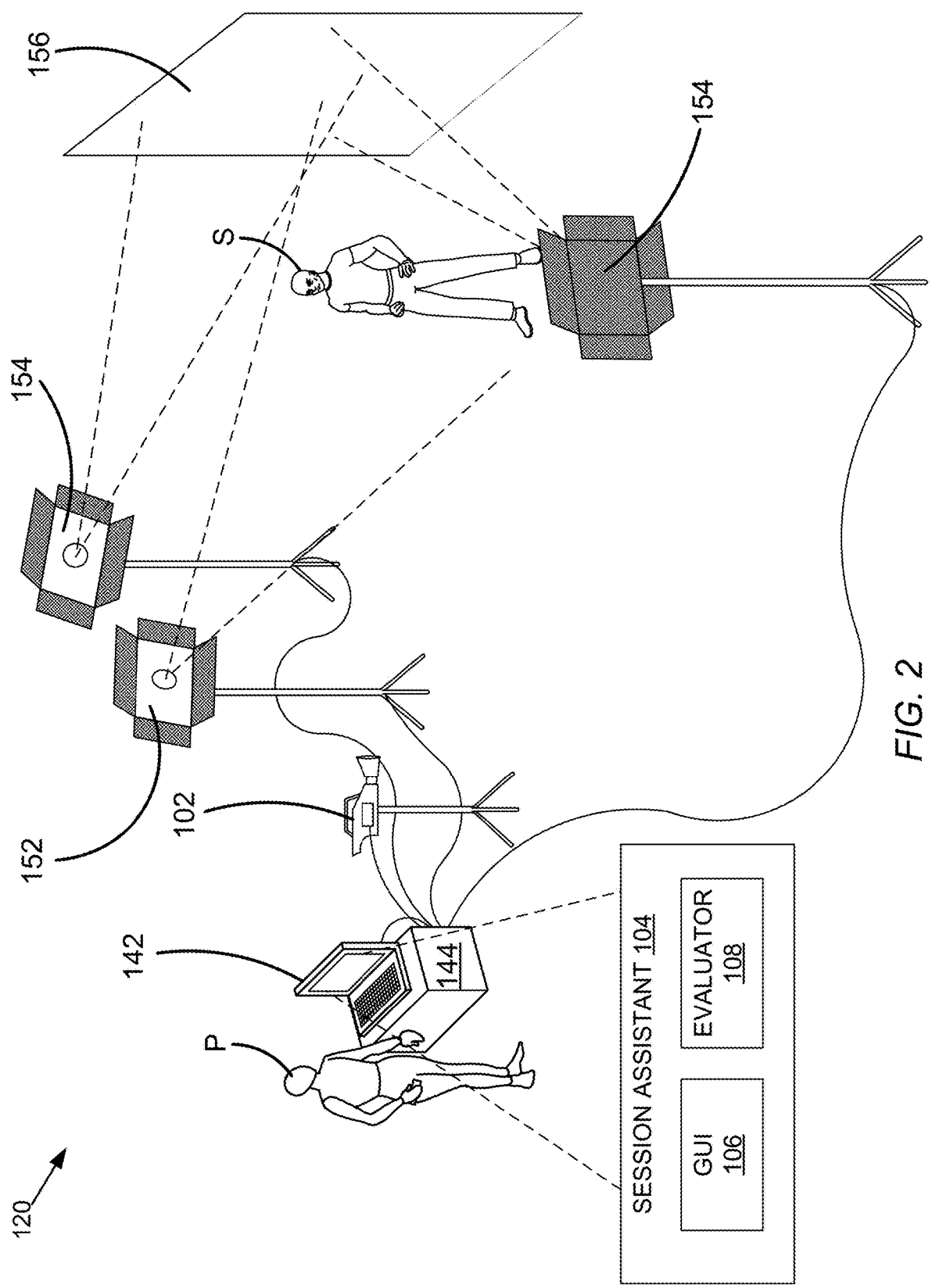
FIG. 2 is a schematic diagram of an example of a photography station.
Figure 3:
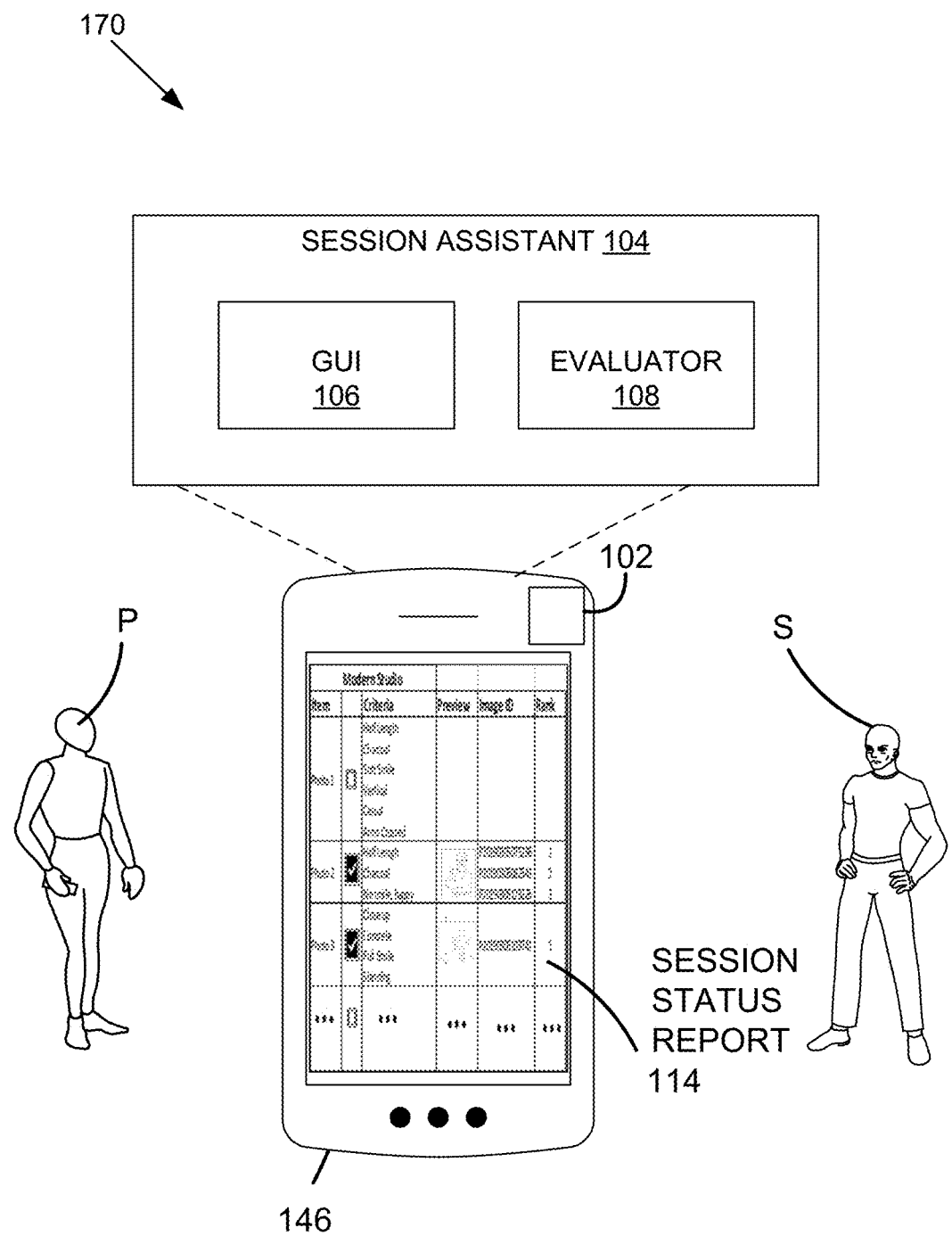
FIG. 3 is a schematic diagram of an example of a mobile photography system.

In some embodiments, the photography system 100 can be used by a photographer P during a photography session as a way to ensure that a portrait order specification 112 is completed. In some embodiments, a customer can choose a particular photography package that includes a set of photographs having certain criteria, such as certain poses, sizes, facial expressions, crop lengths, etc. In other embodiments the portrait order specification 112 can be chosen by any one or more of a photographer P, a subject S, a customer, or some other entity to identify a set of desired photographs to be captured during the photography session. In some embodiments, a chosen photography package can be associated with a portrait order specification 112 that contains data defining the criteria for the photographs in the photography package. In other embodiments, a photograph specification can be used in place of the portrait order specification 112. The photograph specification is the same as or similar to the portrait order specification 112 described herein, except that it is not necessarily associated with an order, such as a particular photography package or a set of photographs that have been ordered. Similar to the portrait order specification 112, however, the photography specification can include certain criteria for a set of photographs to be obtained, such as certain poses, sizes, facial expressions, crop lengths, etc. A photograph specification can also contain data defining the criteria for the set of photographs. In some embodiments, the photography system 100 is used in the context of a professional photography studio having a photography station, such as shown in FIG. 2. In other embodiments, the photography system 100 is used in the context of mobile photography, such as shown in FIG. 3.

The photography system 100 includes the camera 102 and the session assistant 104. The camera 102 captures the image 110 for evaluation by the session assistant 104. In some embodiments, the camera 102 is operated by a photographer P and captures images of a subject S. In other embodiments, the camera 102 can be operated by the subject S, such as with a remote control or using a timer, or by another individual, or the camera 102 can be programmed to operate automatically to capture the image 110. The camera 102 is typically a digital camera, although a film camera could also be used in another embodiment. If film cameras are used, the resulting prints are typically scanned by a scanner device into digital form for subsequent processing by the session assistant 104. The camera 102 can be a still or video camera. The resulting digital images 110 are at least temporarily stored in computer readable storage medium, which are then transferred to the session assistant 104. The transfer can occur across a data communication network (such as the Internet, a local area network, a cellular telephone network, or other data communication network), or can occur by physically transferring the computer readable storage medium containing the images (such as by personal delivery or mail) to the session assistant 104.

In some embodiments, the session assistant 104 operates to interact with the photographer via the graphical user interface 106 for selecting the portrait order specification 112, evaluate the image 110 based at least in part on the portrait order specification 112, and indicate whether the image 110 satisfies the criteria of any of the required photographs in the portrait order specification 112. Examples of the session assistant 104 are illustrated and described in more detail herein with reference to FIG. 9.

The session assistant 104 generates a graphical user interface (GUI) 106 for interacting with a photographer, or a user. The graphical user interface 106 can receive input via the GUI, for example, the selection of the portrait order specification 112 from a database of portrait order specifications, and can display outputs, such as the session status report 114. Examples of the graphical user interface 106 are illustrated and described in more detail herein with reference to FIG. 9, and examples of the session status report 114 are illustrated and described in more detail herein with reference to FIGS. 6-7.

In some embodiments, the evaluator 108 can determine if the image 110 satisfies the criteria for one of the required photographs in the portrait order specification 112. Examples of the evaluator 108 are illustrated and described in more detail herein with reference to FIG. 9.

The portrait order specification 112 can include a set of required photographs and a set of required criteria for each of the required photographs. Examples of the portrait order specification 112 are illustrated and described in more detail herein with reference to FIG. 5.

FIG. 2 is a schematic block diagram of an example of a photography station 120. The photography station 120 is an example of the photography system 100, shown in FIG. 1. In the example shown, the photography station 120 includes a camera 102, a computing device 142, a controller 144, foreground lights 152, background lights 154, and a background 156. In some embodiments, the photography station 120 further includes a handheld control (not shown) for use by a photographer P. The handheld control can include a capture button, for example, that is pressed by the photographer P to initiate the capture of an image of a subject S with the camera 102, and in some cases, the capture of an image is coordinated with flash lighting.

The photography station 120 operates to capture one or more images 110 of one or more subjects S, and can also operate to collect additional information about the subgroup, such as body position data. In some embodiments, the photography station 120 is controlled by a photographer P, who interacts with the subject S to guide the subject S to a good expression, pose, etc., for satisfying the criteria required in the portrait order specification 112. The photograph P can also indicate to the photography station 120 when an image 110 should be captured.

The camera 102 operates to capture digital images of the subject S. The camera 102 is typically a professional quality digital camera that captures high quality images.

In some embodiments, data from the camera 102 is supplied to a computing device 142. An example of a computing device is illustrated and described in more detail with reference to FIG. 4.

The computing device 142 can be directly or indirectly connected to the camera 102 to receive digital data. Direct connections include wired connections through one or more communication cables, and wireless communication using wireless communication devices (e.g., radio, infrared, etc.). Indirect connections include communication through one or more intermediary devices, such as a controller 144, other communication devices, other computing devices, a data communication network, and the like. Indirect connections include any communication link in which data can be communicated from one device to another device.

In some embodiments, the computing device 142 can include the session assistant 104. In such embodiments, the computing device 142 and camera 102 form the hardware implementation of the photography system 100. The computing device 142 can include a display which can display the graphical user interface 106 GUI for the photography P to select the portrait order specification 112 for the photography session, and which can display the session status report 114 to update the photographer P regarding progress being made in completing the portrait order specification 112 during the photography session.

Some embodiments further include a controller 144. The controller 144 operates, for example, to synchronize operation of the camera 102 with the foreground lights 152 and the background lights 154. Synchronization can alternatively be performed by the computing device 142 in some embodiments.

Some embodiments further include a data input device, such as a barcode scanner, which can be integrated with the handheld control, or a separate device. The barcode scanner can be used to input data into the photography station 120.

For example, a subject S can be provided with a card containing a barcode. The barcode is scanned by the data input device to retrieve barcode data. The barcode data includes, or is associated with, subject data, such as meta-data 292 that identifies the subject. The barcode data can also include or be associated with additional data, such as order data (e.g., a purchase order for products made from the images), group affiliation data (e.g., identifying the subject S as being affiliated with a school, church, business, club, sports team, etc.), or other helpful information. The computing device 142 can alternatively, or additionally, operate as the data input device in some embodiments. For example, a user such as the photographer P, may directly enter data via the keyboard, mouse, or touch sensor of the computing device 142, such as order data, group affiliation data, or data associated with the photography session, the portrait order specification 112, or data associated with an image 110. In some embodiments, a photographer can enter notes or other data regarding the required criteria that the particular image 110 is intended to capture such as pose, facial expression, crop length, included props, image orientation, etc.

In the example shown, the photography station 120 includes background lights 154. In some embodiments, a single background light 154 is included. The background lights can include one or more light sources, such as incandescent bulbs, fluorescent lamps, light-emitting diodes, discharge lamps, and the like. The background lights 154 are arranged and configured to illuminate the background 156. In some embodiments the background lights 154 are arranged at least partially forward of the background 156, to illuminate a forward facing surface of the background 156. In other embodiments, the background lights 154 are arranged at least partially behind the background, to illuminate a translucent background 156 from behind.

In some embodiments, the photography station 120 includes foreground lights 152. In some embodiments, a single foreground light 152 is included. The foreground lights 152 can include one or more light sources, such as incandescent bulbs, fluorescent lamps, light-emitting diodes, discharge lamps, and the like. The foreground lights 152 can include multiple lights, such as a main light and a fill light. Each of these lights can include one or more light sources.

The foreground lights 152 are arranged at least partially forward of the subject S to illuminate the subject S while an image 110 is being taken. Because a background 156 is typically positioned behind the subject S, the foreground lights 152 can also illuminate the background 156.

The photography station 120 can include a background 156. The background 156 is typically a sheet of one or more materials that is arranged behind a subject S while an image 110 of the subject S is captured. In some embodiments the background 156 is translucent, such that at least some of the light from the background light 154 is allowed to pass through. An example of a suitable material for the background 156 is a rear projection screen material. Other embodiments illuminate the background 156 from the front (but behind the subject S), such that background 156 need not be translucent. An example of a suitable material for the background 156, when front illumination is used, is a front projection screen material. In some embodiments, the background 156 is of a predetermined color and texture and specified in the portrait order specification 112 as part of the criteria for a set of required photographs.

FIG. 3 is a schematic diagram of an example of a mobile photography system 170. The mobile photography system 170 is another example of the photography system 100, shown in FIG. 1. In the example shown, the mobile photography system 170 includes a camera 102, and computing device 146, a session assistant 104 including a graphical user interface 106 and evaluator 108, a session status report 114, a photographer P, and a subject S. The example in FIG. 3 also includes the session assistant 104, which includes the graphical user interface 106 and the evaluator 108.

In the embodiment shown, the computing device 146 is a mobile device, such as a smartphone, and the camera 102 is a digital camera integrated with the computing device. In some embodiments, the subject S can also be the photographer P, for example, when taking a self-image, or "selfie."

In the embodiment shown, the computing device 146 includes the session assistant 104, which includes the graphical user interface 106 and the evaluator 108. As such, by including both the camera 102 and the session assistant 104, the computing device 146 forms the hardware implementation of the photography system 100 in the example shown. The computing device 146 can include a display which can display the graphical user interface 106 GUI for the photographer P to select the portrait order specification 112 for the photography session, and which can display the session status report 114 to update the photographer P regarding progress being made in completing the portrait order specification 112 during the photography session. An example of a computing device 146 is illustrated and described in more detail with reference to FIG. 4.

In some embodiments, the session assistant 104 can be implemented on separate hardware. For example, the session assistant 104 can be an application on the computing device 146 that is configured to display the GUI 106, receive a selection of the portrait order specification 112, and acquire the image 110, while the evaluator 108 can reside on a remote server. The image 110 and portrait order specification 112 can then be uploaded to the evaluator 108 on the remote server via a network, such as the internet, which can then send results back to the computing device for display through the graphical user interface 106.

Figure 4:
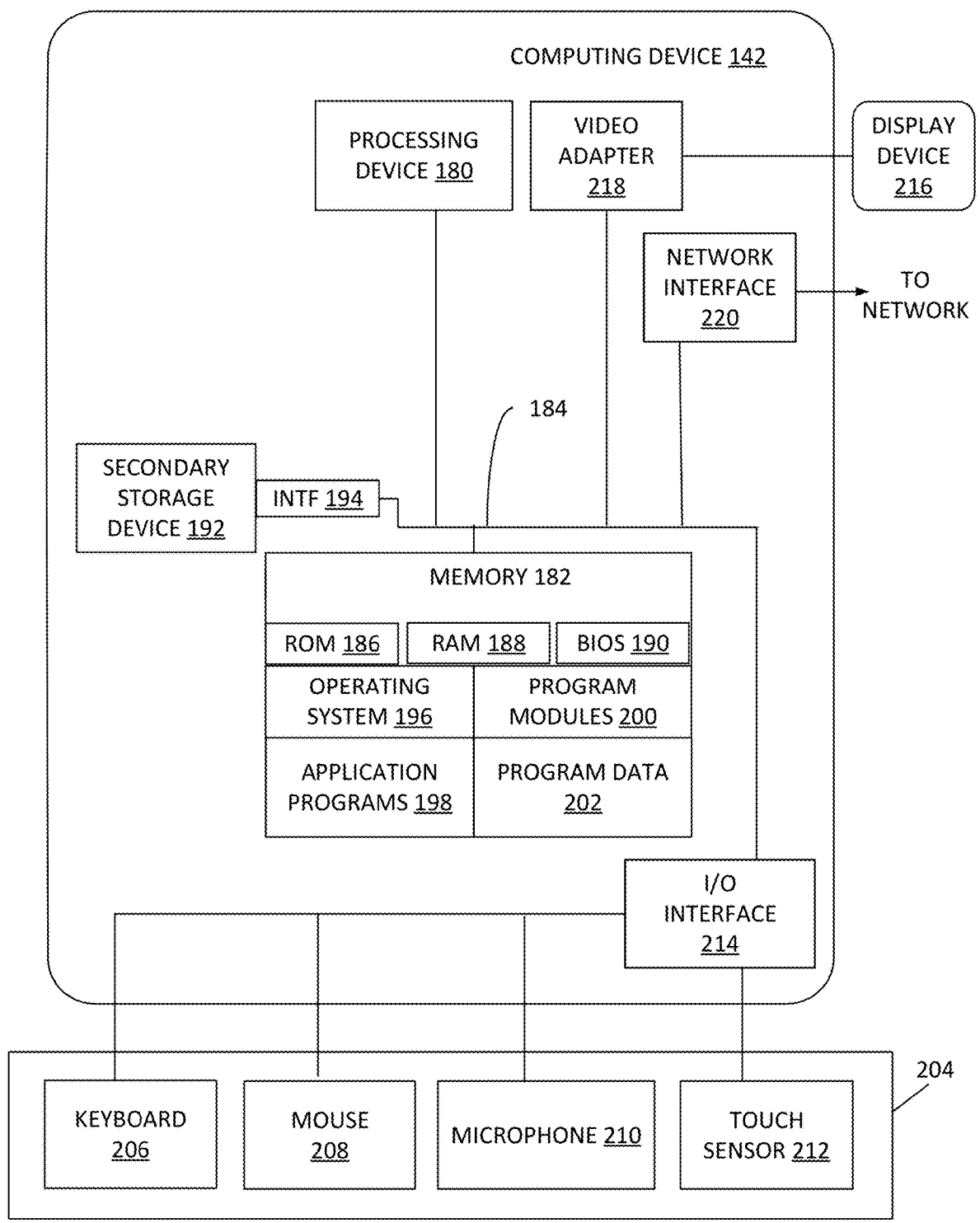
FIG. 4 illustrates an exemplary architecture of a computing device that can be used to implement aspects of the present disclosure, including any of the plurality of computing devices described herein.

FIG. 4 illustrates an exemplary architecture of a computing device that can be used to implement aspects of the present disclosure, including any of the plurality of computing devices described herein. The computing device illustrated in FIG. 4 can be used to execute the operating system, application programs, and software described herein. By way of example, the computing device will be described below as the computing device 142 of the photography station 120, shown in FIG. 2. To avoid undue repetition, this description of the computing device will not be separately repeated herein for each of the other computing devices, including the computing devices 142 and 146, but such devices can also be configured as illustrated and described with reference to FIG. 4.

The computing device 142 includes, in some embodiments, at least one processing device 180, such as a central processing unit (CPU). A variety of processing devices are available from a variety of manufacturers, for example, Intel or Advanced Micro Devices. In this example, the computing device 142 also includes a system memory 182, and a system bus 184 that couples various system components including the system memory 182 to the processing device 180. The system bus 184 is one of any number of types of bus structures including a memory bus, or memory controller; a peripheral bus; and a local bus using any of a variety of bus architectures.

Examples of computing devices suitable for the computing device 142 include a desktop computer, a laptop computer, a tablet computer, a mobile computing device (such as a smartphone, an iPod® or iPad® mobile digital device, or other mobile devices), or other devices configured to process digital instructions.

The system memory 182 includes read only memory 186 and random access memory 188. A basic input/output system 190 containing the basic routines that act to transfer information within computing device 142, such as during start up, is typically stored in the read only memory 186.

The computing device 142 also includes a secondary storage device 192 in some embodiments, such as a hard disk drive, for storing digital data. The secondary storage device 192 is connected to the system bus 184 by a secondary storage interface 194. The secondary storage devices 192 and their associated computer readable media provide non-volatile storage of computer readable instructions (including application programs and program modules), data structures, and other data for the computing device 142.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 192 or memory 182, including an operating system 196, one or more application programs 198, other program modules 200 (such as the software described herein), and program data 202. The computing device 142 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides inputs to the computing device 142 through one or more input devices 204. Examples of input devices 204 include a keyboard 206, mouse 208, microphone 210, and touch sensor 212 (such as a touchpad or touch sensitive display). Other embodiments include other input devices 204. The input devices are often connected to the processing device 180 through an input/output interface 214 that is coupled to the system bus 184. These input devices 204 can be connected by any number of input/output interfaces, such as a parallel port, serial port, game port, or a universal serial bus. Wireless communication between input devices and the interface 214 is possible as well, and includes infrared, BLUETOOTH® wireless technology, 802.11a/b/g/n, cellular, or other radio frequency communication systems in some possible embodiments.

In this example embodiment, a display device 216, such as a monitor, liquid crystal display device, projector, or touch sensitive display device, is also connected to the system bus 184 via an interface, such as a video adapter 218. In addition to the display device 216, the computing device 142 can include various other peripheral devices (not shown), such as speakers or a printer.

When used in a local area networking environment or a wide area networking environment (such as the Internet), the computing device 142 is typically connected to the network through a network interface 220, such as an Ethernet interface. Other possible embodiments use other communication devices. For example, some embodiments of the computing device 142 include a modem for communicating across the network.

The computing device 142 typically includes at least some form of computer readable media. Computer readable media includes any available media that can be accessed by the computing device 142. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 142.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 4 is also an example of programmable electronics, which may include one or more such computing devices, and when multiple computing devices are included, such computing devices can be coupled together with a suitable data communication network so as to collectively perform the various functions, methods, or operations disclosed herein.

FIG. 5 is a schematic block diagram of an example portrait order specification 112. In the example shown, the portrait order specification 112 is organized in a row-column spreadsheet format, and includes a portrait order specification name 250, a list 252 of required photographs 256, and a list 254 of required criteria 258. As shown, the list 252 includes required photographs 256*a-n*, where n can be the number of required photographs in the list 252. Also as shown, the list 254 includes required criteria 258*a-n*. In some embodiments, the portrait order specification 112 can be a data set organized in any suitable manner.

In some embodiments, the portrait order specification 112 has a unique identifier or portrait order specification name 250. A plurality of portrait order specifications 112 can be stored, such as in memory on a computing device 142, and each can have a unique identifier or portrait order specification name 250 to assist a photographer P in selecting a portrait order specification containing a desired set of required photographs 256.

As shown in the example, the required photographs 256 are associated with the required criteria 258. For example, the required photograph 256*a* is associated with the required criteria 258*a*, the required photograph 256*b* is associated with the required criteria 258*b*, and the required photograph 256*c* is associated with the required criteria 258*c*. In some embodiments, different required photographs 256 can be associated with required criteria 258 having different criteria, and differing numbers of criteria items. For example, FIG. 5 illustrates required photograph 256*a* associated with required criteria 258*a* which has four criteria items listed: crop, facial expression, vertical/horizontal image orientation, and pose. FIG. 5 illustrates required photograph 256*b* associated with required criteria 258*b* which has two criteria items listed: crop, and facial expression. FIG. 5 also illustrates required photograph 256*c* associated with required criteria 258*c* which has three criteria items listed: crop, facial expression, and pose. In some embodiments, the portrait order specification 112 may have fewer or more required photographs 256 than shown in FIG. 5, illustrated as required photograph 256*n*, and the associated required criteria 258 may have fewer or more required criteria items, and differing criteria items, than are shown in FIG. 5, as illustrated by required criteria 258*n*.

In some embodiments, the required criteria 258 associated with a required photograph 256 designate features that the required photograph includes. As such, the image 110 must include the features designated by the required criteria 258 in order for that image 110 to qualify as the required photograph 256. By way of example, in the portrait order specification 112 illustrated in FIG. 5, an image 110 taken during a photography session must include the designated crop (e.g. close up, full length, half length, etc.), and facial expression (e.g. full smile, soft smile, game face, etc.) as specified by the required criteria 258*b* in order for it to qualify as the required photograph 256*b* in the portrait order specification 112. In some embodiments, the evaluator 108 determines whether the image 110 includes such features. In some embodiments, the photographer P determines whether the image 110 includes such features. For example, the session assistant 104 can indicate to the photographer P whether the image 110 includes features associated with the required criteria 258 for at least one of the required photographs 256 in the portrait order specification 112 via a session status report 114 displayed in a graphical user interface 106, and the photographer P determines whether the image 110 includes such features and can provide input, for example, by selecting that the image 110 satisfies the required criteria 258 for one more required photographs 256 via user input mechanisms of the graphical user interface 106.

As described above with respect to FIG. 1, a photograph specification can alternatively be used in place of the portrait order specification 112 described herein. The photograph specification can contain, for example, data defining the criteria for a set of desired photographs. In some embodiments, a photograph specification specifies a group photo including a number of subjects at one or more scenes or locations, for example in a mobile photography context, as illustrated in FIG. 3. The photographer P may take a larger number of photos at each scene in a mobile photography session as compared to a photography session in a photography studio or at a photography station. For example, the lighting conditions in a mobile photography context may not be as well controlled as in a studio or station, and a large number of images may need to be taken to in order to satisfy the required criteria 258 of the photograph specification. In some embodiments, a photograph specification can be chosen by the photographer P, the subject or subjects S, or by some other user of the session assistant 104. In some embodiments, the photograph specification contains default required criteria 258, for example, a facial expression (e.g.

smiling, eyes open and not blinking or winking, etc.), crop (e.g. close up, full length, half length, subject or subjects S located in a certain portion of the image, etc.), pose (e.g. sitting, standing, running, jumping, etc.), image quality (e.g. sharp and not blurry), etc. In other embodiments, the required criteria 258 for the set of required photographs are chosen by the photographer P, the subject or subjects S, or some other user of the session assistant 104. In still other embodiments, the photographer P, or subject S, or other user, can define new or additional required criteria 258.

Each of the components of the exemplary session status report will be discussed below with reference to both FIGS. 6-7 concurrently.

Figure 7:
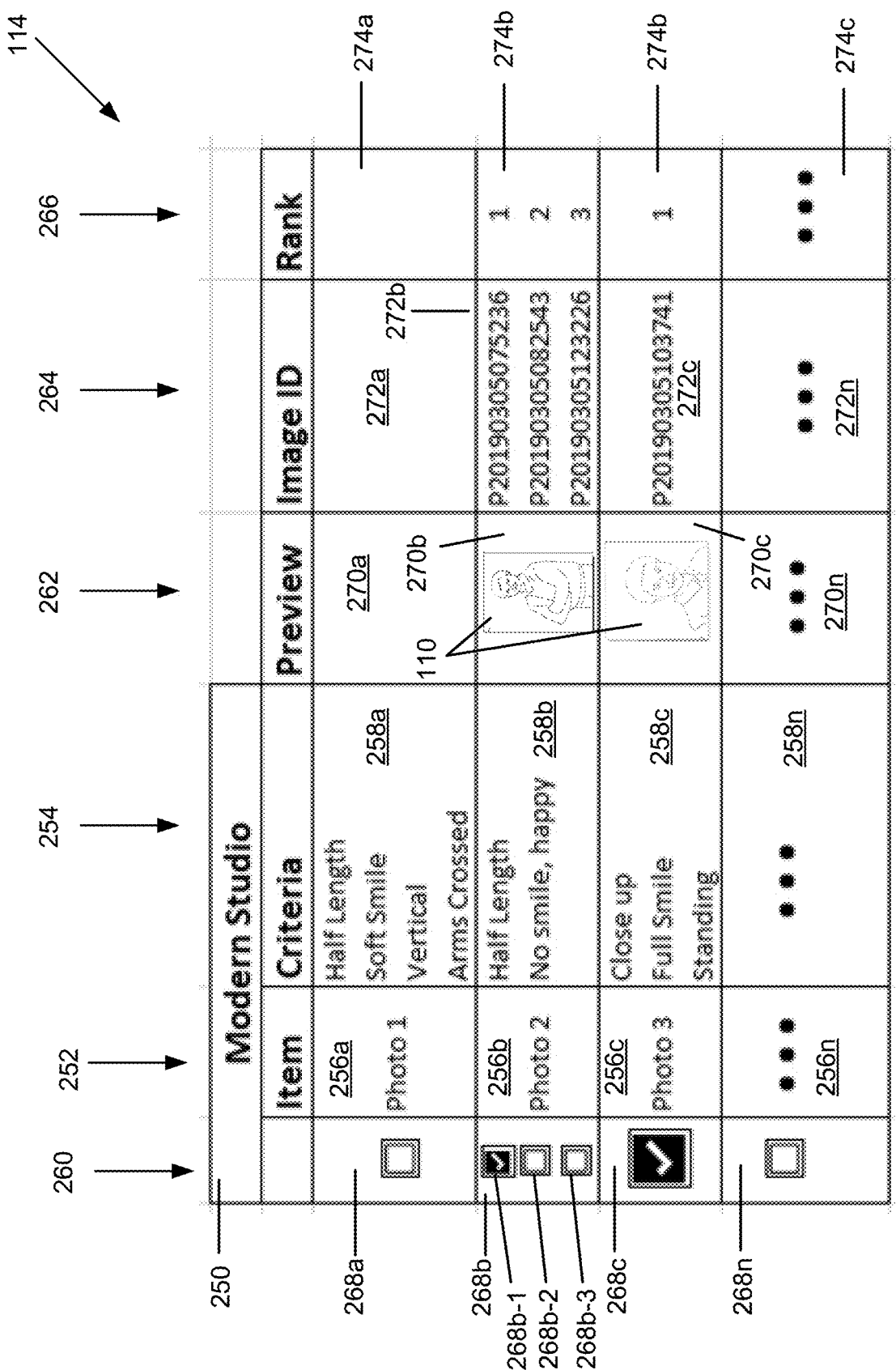
FIG. 7 is a schematic block diagram of another example photography session status report.

FIGS. 6-7 are schematic block diagrams of example photography session status reports 114. The examples shown in FIGS. 6-7 include session status report 114. The examples shown also includes a list 252 of required photographs 256, a list 254 of required criteria 258, a list 260 of indicators 268a-n, a list 262 of image previews 270a-n, a list 264 of image identifiers 272a-n, and a list 266 of image rankings 274a-n. The example shown in FIG. 6 illustrates a session status report 114 where no image 110 is associated with any required photograph 256, which can occur, for example, at the beginning of a photography session. The example shown in FIG. 7 illustrates a session status report 114 indicating several images 110 that are associated with at least one required photograph 256.

In the examples shown in FIG. 6, the session status report 114 is organized as a row-column spreadsheet for display, such as in the graphical user interface 106. The session status report 114 can display the portrait order specification 112 data, e.g. the list 252 of required photographs 256 and the list 254 of required criteria 258 in analogous columns as that illustrated in FIG. 5. The session status report 114 can also display the portrait order specification name 250 of the selected portrait order specification 112.

In some embodiments, the list 260 of indicators 268a-n give visual feedback as to whether an image 110 that has been taken during a photography session satisfies the required criteria 258 and therefore qualifies as a required photograph 256. In the example shown in FIG. 7, the indicators 268a, n are blank checkboxes indicating that there is no image 110 that qualifies as required photographs 256a, n, and the indicators 268 b, c are checked checkboxes indicating that at least one image 110 qualifies as required photographs 256b, c. Other indicators can be used as indicators 268a-n, for example, color highlighting of a spreadsheet cell, text indicating yes or no, etc. In some embodiments, the indicators 268 can be configured to receive input, for example, a photographer P can click on, touch, or use other input mechanisms to activate a checkbox 268 such that it is checked or deactivate a checkbox 268 such that it is unchecked. In some embodiments, the presence of an image preview 270 or an image identifier 272 can give visual feedback as to whether an image 110 is associated with a required photograph 256, and the indicators 268 can receive input, e.g. from the photographer P, that an image 110 satisfies the required criteria 258 of a required photograph 256 and therefore qualifies as the required photograph 256. In other embodiments, the indicators 268 can be automatically activated, such as when an image 110 is automatically evaluated and determined to satisfy the required criteria 258 of a required photograph, for example by the evaluator 108.

In some embodiments, the list 262 of image previews 270a-n give visual feedback that an image 110 is associated with a required photograph 256. As shown in the example in FIG. 7, if there are more than one image 110 that are associated with a required photograph 256, the image preview 270 can be a thumbnail image representing one of the associated images 110. In some embodiments, an image 110 can be associated with more than one required photograph 256.

In some embodiments, the list 264 of image identifiers 272a-n includes unique identifiers for the images 110 that are associated with required photographs 256. In some examples, the unique identifier is the filename of the digital file in which the image 110 is stored, which can include a file path for determining the storage location of the digital file. In some embodiments, more than one image identifier can be displayed for more than one image 110 that is associated with a required photograph 256. In the example shown in FIG. 7, three images 110 are associated with the required photograph 256b, corresponding to three image identifiers 272b and the checkboxes 268b, and one image 110 is associated with the required photograph 256c, corresponding to one image identifier 272c and the checked checkbox 268c. FIG. 7 also shows that there are no images 110 as associated with the required photographs 256a, n, corresponding to the unchecked checkboxes 268a, n, no image previews 270a, n appearing in the list 262, and no image identifiers 272a, n appearing in the list 264.

In some embodiments, the list 266 includes image rankings 274a-n for the images 110 that qualify as required photographs 256. In some embodiments, an image 110 as associated with a required photograph 256 is only ranked against other images 110 as associated with the same required photograph 256. For example, as shown in FIG. 7, the three images 110 as associated with the required photograph 256b in the Modern Studio portrait order specification 112 include numeric rankings 274b of 1-3, in a top-to-bottom order, as displayed in the list 266 of the Modern Studio session status report 114. In the example shown, the 1-3 rankings are displayed at the same row height as the corresponding image identifiers 272b to indicate which image 110 corresponds to which ranking.

In some embodiments, the image rankings 274 are based on a required level of quality. In some embodiments, the required level of quality is determined by whether the image 110 includes features associated with certain required criteria items, e.g. the level of quality can be on a binary scale. For example, for a required photograph 256 requiring a portrait orientation, the level of quality for an image 110 that is a portrait image would be 100%, or 1, or "yes," etc., as to that orientation criteria, and an image 110 that is a landscape image would be 0%, or 0, or "no," etc., as to that orientation criteria. In some embodiments, the level of quality may be on a continuous scale, for example, for a required photograph 256 requiring a soft-smile facial expression, the level of quality can be categorized into appropriate categories depending on facial expression detection, or the level of quality can be numeric representing the closeness of the facial expression detected in the image 110 to a pre-determined, or expected, target soft-smile feature characteristics.

In some embodiments, a quality score for an image 110 can be determined based on an aggregation of levels of quality for all of the required criteria items associated with a required photograph 256. For example, for a required photograph 256 having required crop, facial expression, and pose criteria, the quality score of an image 110 including features associated with those required criteria can be determined by comparing, summing, or otherwise aggregating the levels of quality determined for each of the image 110, crop, facial expression, and pose included. In some embodiments, levels of quality for each individual required criteria item can be weighted such that the quality score is determined by a weighted aggregation.

Referring now to FIGS. 6-7 generally, in some embodiments, the session status report 114 can include fewer or more items. For example, in some embodiments, the session status report can display the quality score of the image 110 and the level of quality of the features within the image 110.

Figure 8:
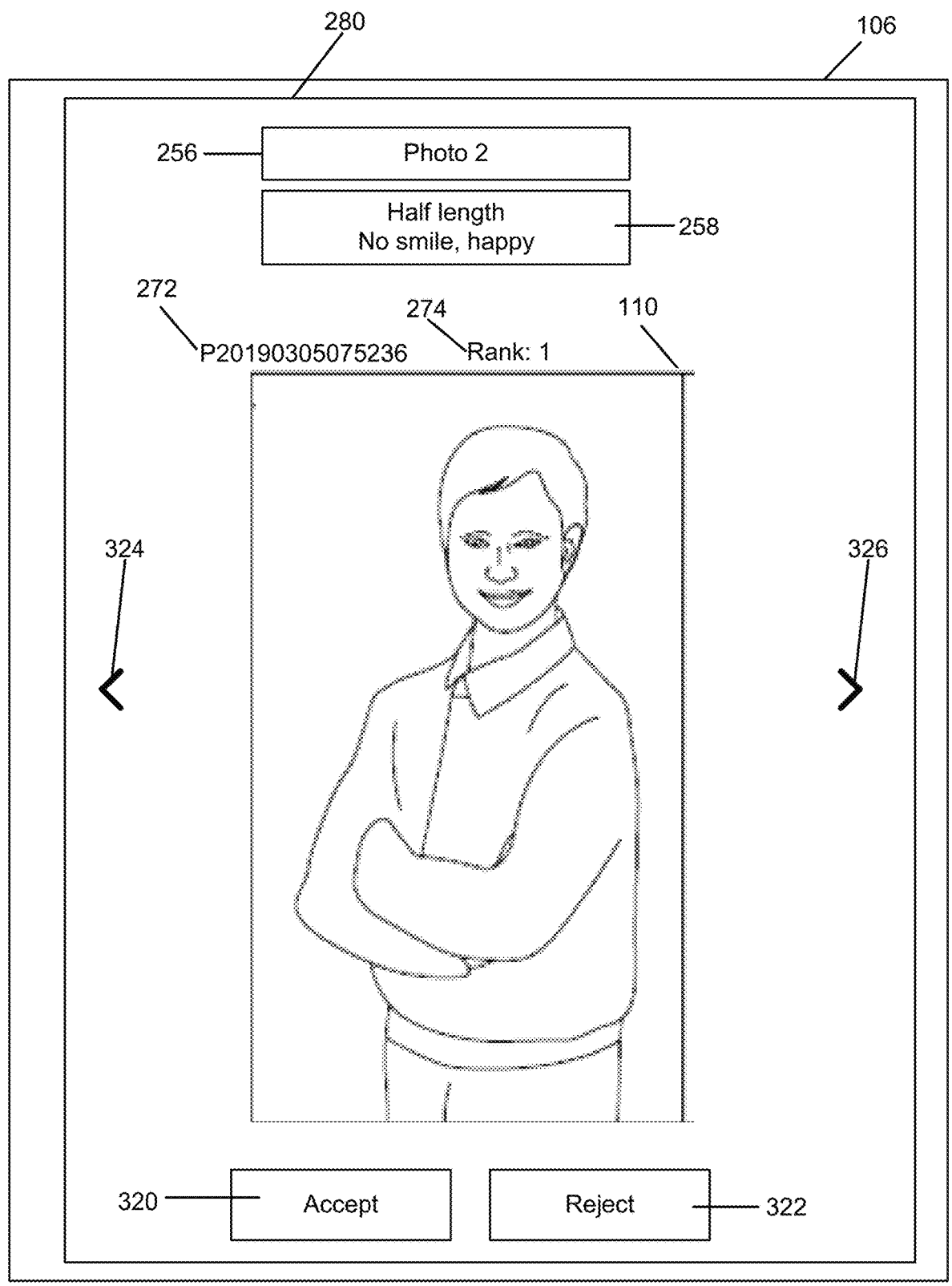
FIG. 8 is a schematic block diagram of a graphical user interface screen for determining whether an image qualifies as a required photograph.

FIG. 8 is a schematic block diagram of a graphical user interface 106 screen for determining whether an image 110 qualifies as a required photograph 256. The example shown in FIG. 8 includes accept button 320, reject button 322, scroll left arrow 324, and scroll right arrow 326. The example shown also includes the image 110, the required photograph 256 and associated required criteria 258, the image identifier 272 of the image 110, and the rank 274 of the image 110. In some embodiments, multiple photos that ranked the highest for a pose are displayed in one view to allow fast review and confirmation by the photographer. In other embodiments, multiple photos that ranked higher than a threshold ranking, or exceeded a threshold quality level or threshold quality score, for a pose, a crop, a facial expression, or other image feature or required criteria, are displayed in a single view to allow fast review and confirmation by the photographer.

In some embodiments, the session GUI display 280 of the graphical user interface 106 can display the image 110 in a screen configured to receive inputs as to whether the image 110 satisfies the required criteria 258 for a required photograph 256, such as inputs from the photographer P. For example, an image 110 can be evaluated and associated with a required photograph 256 by the evaluator 108, and an image preview 270 and image identifier 272 for the image 110 can populate the session status report 114. In some embodiments, the session status report 114 can be configured to receive a selection of the image 110, for example by selecting the image preview 270 or image identifier 272, and the session assistant 104 can process the selection so as to display screen illustrated in FIG. 8 in the session GUI display 280, allowing a larger view of the image 110. In some embodiments, the session GUI display 280 is configured to receive input to digitally zoom and shift the image 110, thereby allowing a user, such as the photograph P, to further view the image 110 at the desired level of detail.

In some embodiments, the accept button 320 is configured to receive a selection, such as by the photographer P, that the image 110 satisfies the required criteria 258 for the required photograph 256, and the session assistant 104 can update the session status report 114 by activating the indicator 268 associated with the required photograph 256. In the example shown, if the photographer P selects the accept button 320, the image 110 (e.g. P20190305075236) is designated as qualifying as the required photograph 256b and the indicator 268b-1 can be checked, as illustrated in FIG. 7. It is noted that more than one image 110 can satisfy the required criteria 258 for one or more required photographs 256, and as such, more than one image 110 can be accepted via the accept button 320 and be designated as qualifying as a required photograph 256. In some embodiments, a selection of the accept button 320 can override a previous determination that the image 110 does not satisfy the required criteria 258.

In some embodiments, the reject button 322 is configured to receive a selection, such as by the photographer P, that the image 110 does not satisfy the required criteria 258 for the required photograph 256, and the session assistant 104 can update the session status report 114 by deactivating the indicator 268 associated with the required photograph 256. In some embodiments, a selection of the reject button 322 can override a previous determination that the image 110 satisfies the required criteria 258 and qualifies as the required photograph 256, thereby disqualifying the image 110 as the required photograph 256.

In some embodiments, a selection of the accept button 320 or the reject button 322 are equivalent to a user, such as the photograph P, checking or unchecking, respectively, the indicator 268 in the session status report 114.

In some embodiments, the left scroll button 324 and right scroll button 326 are configured to replace the image 110 and associated image identifier 272 and image range 274 with a different image 110 and associated image identifier 272 and image rank 274. In some embodiments, all of the images 110 captured during a photography session can be retrieved by the session assistant 104 for display in the session GUI display 280 according to an order. A selection of the left and right scroll buttons 324 and 326 allow the user, such as the photograph P, to scroll through and view the images 110 from the photography session.

In some embodiments, the session GUI 280 can be configured to receive a selection by the user, such as the photograph P, to change the association of the image 110 to a different photograph 256. For example, the photographer P can select the required photograph 256, e.g. Photo 2 as illustrated in FIG. 8, and the graphical user interface can be configured to display a list of the required photographs 256 to the photographer P for selection by the photographer P as being associated with the image 110 being displayed, or the photographer P can select to remove any association of the image 110 with one or more required photographs 256. The session status report 114 can then be updated to add or remove the image 110 in the appropriate row according to the photographer's P selection.

Figure 9:
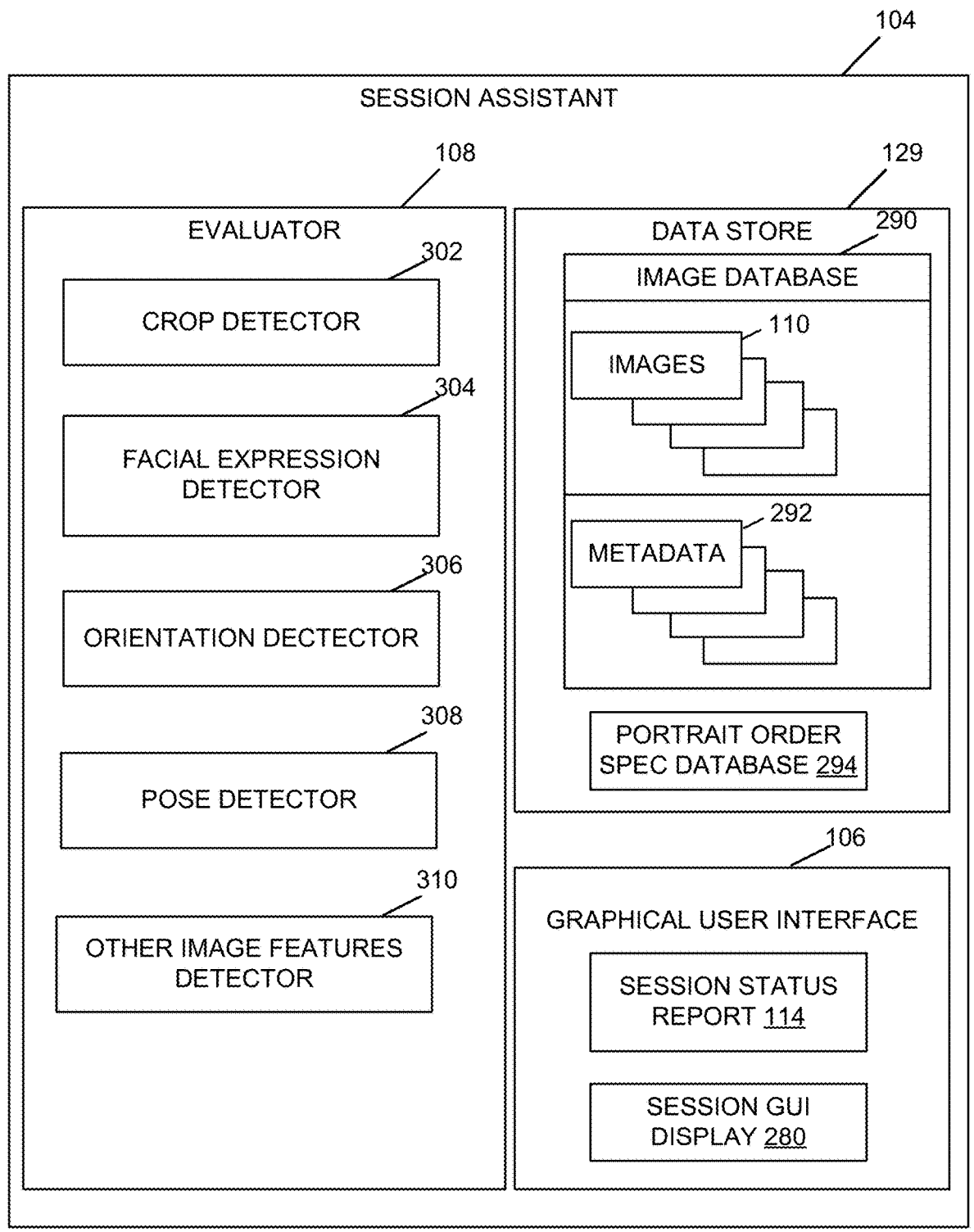
FIG. 9 is a schematic block diagram of a session assistant.

FIG. 9 is a schematic block diagram of a session assistant 104. In the example shown, the session assistant 104 includes a graphical user interface 106, an evaluator 108, and a data store 129. Also as shown in the example, the data store 129 includes in image database 290 and a portrait order specification database 294.

As shown in the example, the graphical user interface 106 includes the session status report 114 and the session GUI display 280. In some embodiments, the graphical user interface 106 is configured to receive input from a user, such as a photographer P. The input can consist of a selection to display a list of portrait order specifications 112 in the session GUI display 280, and the input can also consist of a selection of one of the portrait order specifications 112 for use, either during a photography session or after a photography session as a check on whether the images 110 captured during a photography session completed the portrait order specification 112 by satisfying all of the required criteria 258 in the portrait order specification 112. The input may be received through session GUI display 280 via an input mechanism of a computing device, for example, a touch screen, keyboard, or mouse of computing device 142 or 146. The session assistant 106 can include or be in communication with the evaluator 108 and the data store 129 so as to send data from the data store, e.g. the image 110 from the image database 290 and the selected portrait order specification 112 from the portrait order specification database 294.

As shown in the example, the evaluator 108 includes a crop detector 302, a facial expression detector 304, an orientation detector 306, a pose detector 308, and an other image features detector 310. In some embodiments, the evaluator 108 is configured to receive images and data, such as the image 110 and data such as required criteria 258, determine whether an image 110 can be associated with a required photograph 256 by identifying and processing features included in the image 110. In some embodiments, the evaluator 108 can output whether the image 110 includes features associated with the required criteria 258 and associated the image 110 with one or more required photographs 256. In some embodiments, the evaluator 108 can determine the level of quality of the image 110 relative to the required criteria 258, rank the image 110 among multiple images 110 that associated with a particular required photograph 256, and determine a quality score of the image 110 as discussed above with respect to FIG. 7.

In some embodiments, the crop detector 302 is configured to determine the crop of the image 110. In some embodiments, crop, or alternatively referred to as crop length, (e.g. close up, full length, half-length, etc.), is the portion of the subject S that is visible in the image 110. The crop can be set by the field of the view of the camera 102, for example by setting the focal length of a telephoto zoom lens of the camera 102, or by physically moving the camera 102 closer or farther away from the subject S. The crop can also be set by selecting portions of a full resolution image and resizing those portions to the desired physical dimensions, e.g. digital zoom. In some embodiments, crop lengths can include extreme close up (zooming in to portions of the subjects head or face), close up (including the head of the subject S), head and shoulders, half-length (including the head of the subject S to the waist or belt line of the subject), three-quarter length (from the head of subject S to around the knees of the subject), and full length (from the head to the feed of the subject S). In the example shown in FIG. 11, the required photograph 256c illustrates an example head and shoulders crop, and the required photograph 256f illustrates an example three-quarter length crop.

In some embodiments, the crop detector 302 determines the crop by reading the crop from metadata of the image 110. For example, the camera 102 can include a telephoto zoom lens with electronics that can control autofocus, auto zoom, and auto aperture functionality to control image sharpness and resolution, magnification and field of view, and amount of light collected by the lens. Such a lens may also directly sense or control its focus, zoom (e.g. 18-55 mm, 75-300 mm, etc.), and aperture (F/2.8, F/4, F/16, etc.), or be in electronic communication with a camera body of camera 102 having electronics that control those lens parameters, or be in communication with a computing device 142 or 146, or a controller 144 that control focus, zoom, and aperture. In some embodiments, the lens settings (focus, zoom, aperture, etc.) when an image 110 is captured can be combined with the image 110 data in the image data file as metadata 292, and stored in the image database 290 in the data store 129.

In some embodiments, the crop detector 302 determines the crop of the image 110 by using image analysis, such as determining face points and body points of the subject S included in the image 110 via depth and position detection. The details regarding depth and position detection can be found in U.S. patent application Ser. No. 13/777,579 entitled "Photography System with Depth and Position Detection", which is hereby incorporated by reference.

In some embodiments, the facial expression detector 304 is configured to determine a facial expression of one or more subjects S included in the image 110. In some embodiments the facial expression detector 304 determines the facial expression of the subject or subjects S included in the image 110 by reading the facial expressions from metadata 292 of the image 110. For example, as described above in connection with FIG. 1, a photographer P may input data via the computing device 142. Such data may include notes regarding an image 110 being captured, such as the facial expression of the subject S during capture or the facial expression of subject S intended to be captured to satisfy required criteria 258. In some embodiments, input data may be associated with the image 110 and stored as metadata 292.

In some embodiments, the facial expression detector 304 determines the facial expression of the subject S included in the image 110 by using image analysis. As one example, facial expression detection can utilize the technology described in the commonly assigned U.S. patent application Ser. No. 16/012,989, filed on Jun. 20, 2018 by one of the present inventors, titled A HYBRID DEEP LEARNING METHOD FOR RECOGNIZING FACIAL EXPRESSIONS, the disclosure of which is hereby incorporated by reference in its entirety. In some embodiments, facial expressions can include full smile, half-smile, soft smile, no smile but happy, game face, looking away, blink, etc. In some embodiments, facial expression detection includes detecting whether the subject included in the image 110 is blinking, winking, has one or both eyes open or closed, or whether the subject is looking at the camera or looking away. In the example shown in FIG. 11, the required photograph 256a illustrates an example full smile, and the required photograph 256c illustrates an example soft smile.

In some embodiments, the orientation detector 306 is configured to determine the orientation of the subject or subjects S included in the image 110, e.g. horizontal or vertical, and the orientation of the image 110, e.g. portrait or landscape. In some embodiments, the orientation detector 306 is configured to determine orientations by reading the orientation data from metadata 292 of the image 110. In other embodiments, the orientation detector 306 is configured to determine orientations by using the EXIF camera data, or by using the width and height of the image 110.

In some embodiments, the orientation detector 306 is configured to determine the orientations by using image analysis, such as determining face points and body points of the subject S included in the image 110 via depth and position detection. The details regarding depth and position detection can be found in U.S. patent application Ser. No. 13/777,579 entitled "Photography System with Depth and Position Detection", which is previously incorporated by reference. In the example shown in FIG. 12, the required photograph 256a illustrates an example landscape photograph including a horizontal subject S, and the required photograph 256b illustrates an example portrait photograph including a vertical subject S.

In some embodiments, the pose detector 308 is configured to determine the pose, or poses, of one or more subjects S included in the image 110. In some embodiments, pose definition data can be compared with body point position data to determine the pose of a subject, or subjects, S. Pose definition data defines a set of poses by the relative positions of the subject's body parts to each other, e.g. pose definition data can include a set of standing poses and a set of sitting poses. The pose definition data differentiates between the standing and sitting poses by the positions of portions of the body. For example, a standing pose may be defined by the location of the hips being much higher than the location of the knees. Body point position data can be receive from a depth and position detection device, along with digital images including a skeletal model of the subject or subjects S, and depth images of the subject or subjects S. The body point and position data can include data that identifies the locations of subject body points within the digital image, and the skeletal model can be formed and visualized by lines extending between the body points and which provide rough approximations of the skeletal portions of the subject or subjects S. The details regarding pose detection can be found in U.S. patent application Ser. No. 13/777,579 entitled "Photography System with Depth and Position Detection", previously incorporated by reference.

In some embodiments, the other image features detector 310 is configured to determine other predefined or user-defined features included in the image 110. In some embodiments, user-defined features can be received via the session GUI display 280 and communicated to the evaluator 108 by the graphical user interface 106. In some embodiments, the other image features or user-defined features may include hair styles, props, accessories, etc.

In some embodiments, the other image features detector 310 determines the other features by reading the other features data from metadata 292 of the image 110. In some embodiments, the other image features detector 310 determines the other features by using image analysis, such as object recognition, image processing, computer vision, machine learning, or any of those techniques in combination.

As shown in the example, the image database 290 stores the images 110 taken during the photography session and associated metadata 292. The portrait order specification database 294 can store a plurality of portrait order specifications 112.

In some embodiments, the metadata 292 can include subject S identifying data as well as image data such as date and time of capture, image filename and file type, and other image characteristics or image identifying data.

Figure 10:
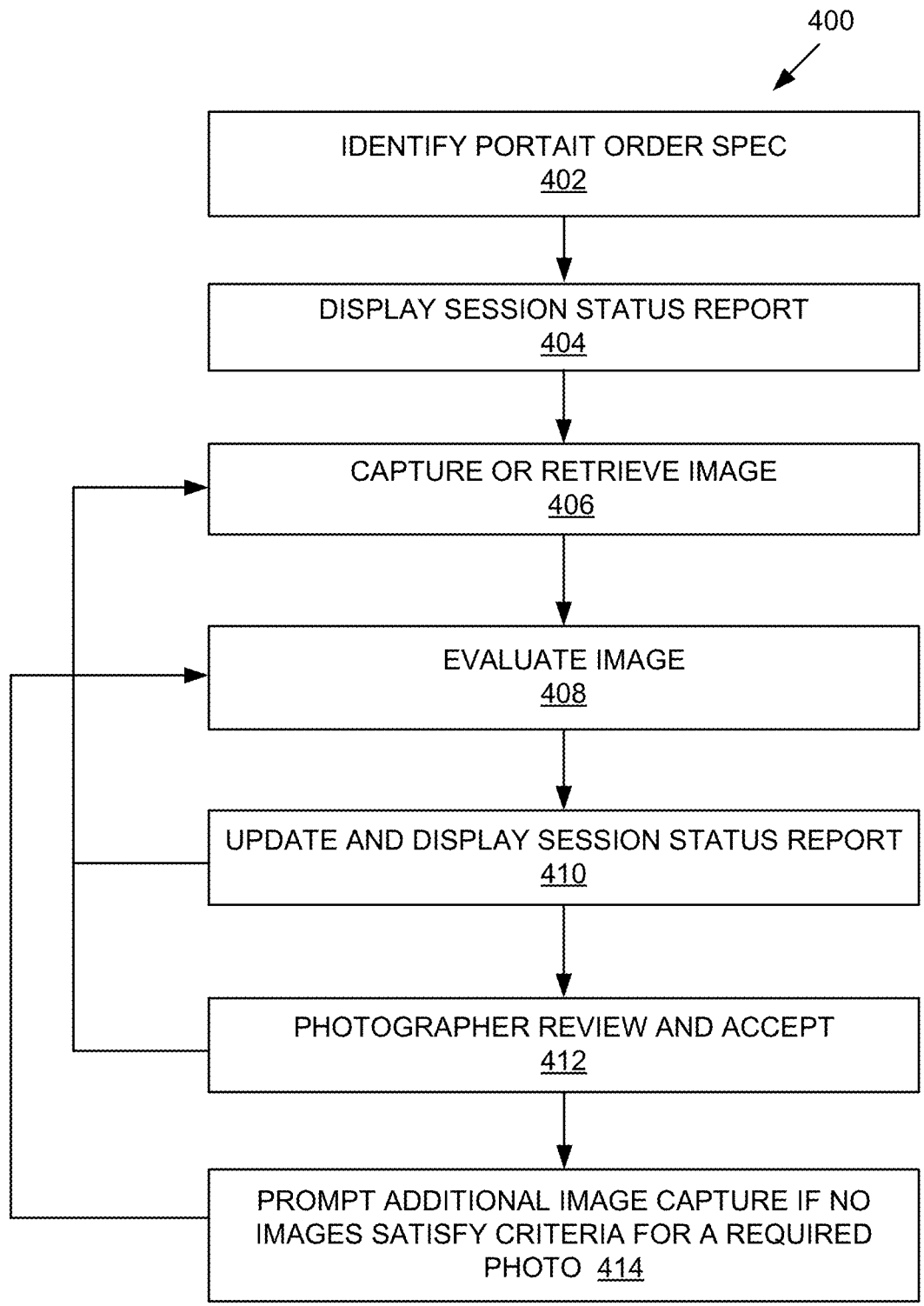
FIG. 10 is a flow chart illustrating an example method of automatically evaluating and suggesting photographs during a photography session.

FIG. 10 is a flow chart illustrating an example method 400 of automatically evaluating and suggesting photographs during a photography session. In this example, the method 400 includes operations 402, 404, 406, 408, and 410.

The operation 402 identifies a portrait order specification 112. The portrait order specification 112 is associated with a photography session, and contains at least a list of one or more required photographs 256, each having associated required criteria 258. Further details regarding an exemplary portrait order specification are discussed above with reference to FIG. 5. In some embodiments, the portrait order specification 112 can be selected by a photographer P using the computing device 142, or the computing device 146, by interacting with the session GUI display 280 of the session assistant 104. For example, the photographer P can select a portrait order specification 112 from among a plurality of portrait order specifications 112 included in the portrait order specification database 294 using user input mechanisms of the computing device 142. In other possible embodiments, the portrait order specification may be preselected or predefined by someone other than the photographer P. The graphical user interface 106 can receive the selection of the particular portrait order specification 112, and can send the portrait order specification 112, or can actuate the portrait order specification 112 to be sent, from the portrait order specification database 294 to the evaluator 108.

The operation 404 displays the session status report 114 on the computing device 142 display via the session GUI display 280. Further details regarding the exemplary session status reports 114 are discussed above with reference to FIGS. 6-7. In some embodiments, the session status report indicates which of the required photographs 256 have been completed and which of the required photographs 256 still need to be completed during the photography session.

The operation 406 captures the image 110. Further details regarding exemplary image capture using the photography station 120 and the mobile photography system 170 are discussed above with reference to FIGS. 2-3. The image 110 can be stored in the image database 290 in the data store 129, and can also be sent to the evaluator 108 for processing. The operation 406 can also retrieve the image 110, for example, from the image database 290. In some embodiments, it may be desired to check if a portrait order specification 112 was completed during a photography session at some time after the photography session. In such embodiments, the image 110 can be sent from the image database 290 to the evaluator 108 for processing.

The operation 408 evaluates the image 110. Further details regarding exemplary image evaluation are discussed above with reference to FIG. 9 and the evaluator 108. Evaluation of the image 110 can associate the image 110 with one or more required photographs 256, determine whether the image 110 satisfies the required criteria 258 associated with any of the required photographs 256 included in the portrait order specification 112 identified in operation 402, determine the quality level of features included in the image 110 with respect to the required criteria 258 and determine a quality score of the image 110, and a rank of the image 110 relative to other images 110 also as associated with a required photograph 256 in the identified portrait order specification 112. In some embodiments, the image 110 can be automatically determined to satisfy the required criteria of one or more required photographs 256, and be designated as qualifying as the required photograph 256 at step 408.

The operation 410 updates the session status report 114 on the computing device 142 display via the session GUI display 280. Further details regarding an exemplary updated session status reports 114 are discussed above with reference to FIG. 7. Updating the session status report can include checking one or more checkboxes 268, displaying an image preview 270 as a thumbnail representation of the image 110, listing the image identifier 272 of the image 110, and listing the rank 274 of the image 110.

In some embodiments, the method 400 can proceed back to the operation 406 after completing operation 410, such as if there are required photographs 256 within the portrait order specification 112 without at least one associated image 110, or if more images 110 are desired.

The operation 412 receives an indication that the image 110 satisfies the required criteria 258 for at least one required photograph 256, and thereby qualifies as the required photograph 256. In some embodiments, the indication is received at the computing device 142 through user input mechanisms, such as those discussed above, using the graphical user interface 106. Further details regarding an exemplary graphical user interface for receiving indications that an image 110 qualifies as one or more required photographs 256 are discussed above with reference to FIG. 8.

In some embodiments, the method 400 can proceed back to the operation 406 after completing the operation 412, such as if there are required photographs 256 within the portrait order specification 112 without at least one associated image 110, or if more images 110 are desired.

If there is at least one required photograph 256 without an image 110 associated with it, or if none of the images 110 are associated with, or satisfy, the required photographs 256, the operation 414 prompts the photographer P to take more images during the session. In some embodiments, the prompt can be an indicator, a pop-up dialog box, a flashing symbol or button, or any indicator to indicate to the photographer P that the session is not complete and there is at least one required photograph for which none of the images 110 taken during the session can satisfy the required criteria or be associated with. In some embodiments, the prompt can be displayed using the graphical user interface 106. In some embodiments, the operation 414 can include capturing, or retrieving, one or more additional images 110, such as described above in connection with the operation 406.

In some embodiments, the method 400 can proceed back to the operation 408 after completing the operation 414, so as to evaluate the additional images 110.

In some embodiments, the operation 400 may be repeated, or alternatively executed as a batch process, for a set of images 110 stored in the image database 290 at some time after a photography session.

Figure 11:
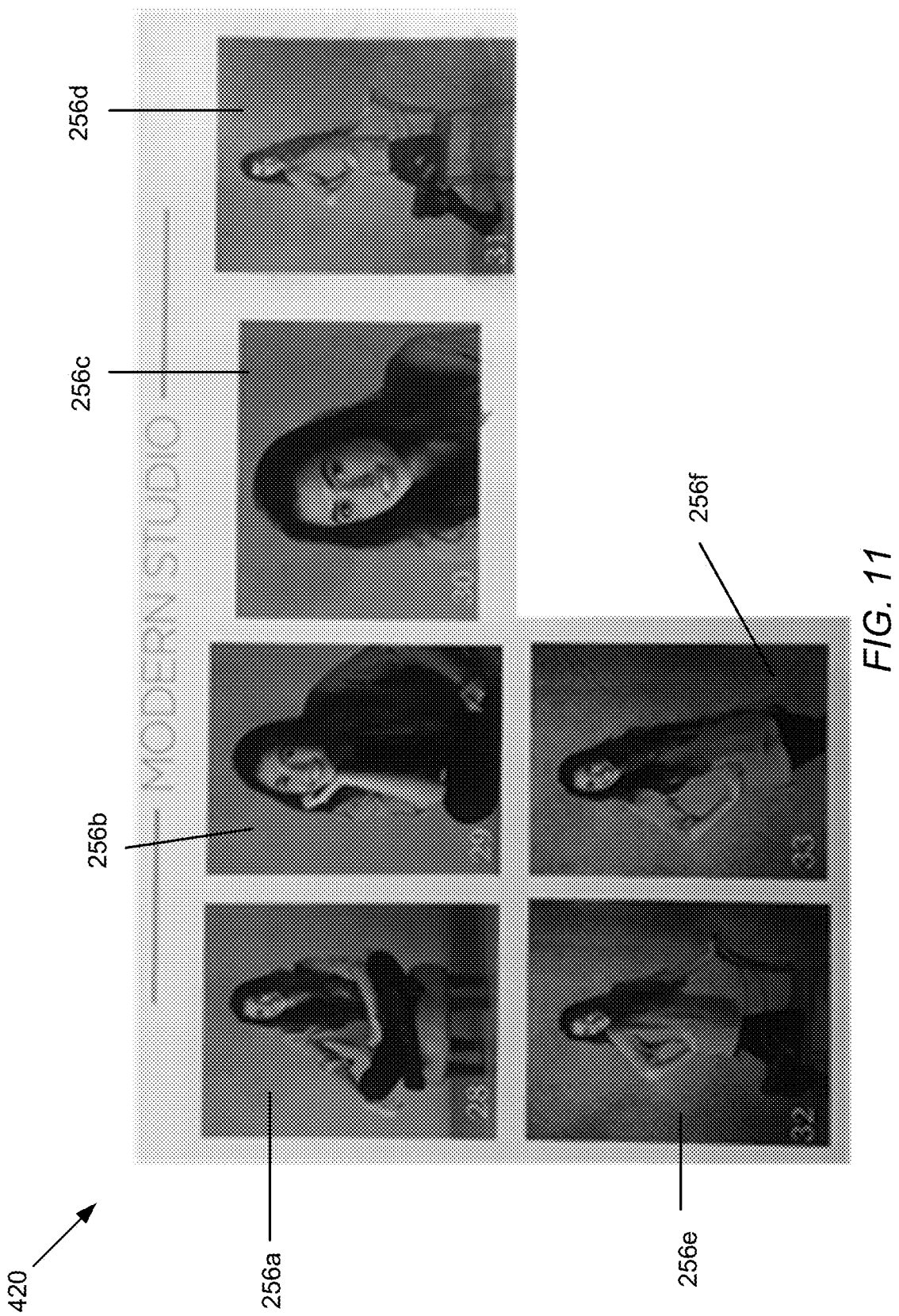
FIG. 11 is a schematic diagram of example required photographs captured during a photography session for a particular photography portrait order specification.

FIG. 11 is a schematic diagram of example required photographs 256 captured during a photography session 420 for a particular photography portrait order specification. In the illustrated example, the required photographs 256a-f were captured during the photography session 420. The required photographs 256a-f illustrate certain required criteria.

In the example shown, the required photograph 256a illustrates a full length crop, a full smile facial expression, a portrait image including a vertical subject orientation, and a seated, casual pose using a stool prop. In the example shown, the required photograph 256b further illustrates a full-length crop with a different pose without the stool prop. In the example shown, the required photograph 256c further illustrates a head and shoulders crop with a soft smile facial expression. In the example shown, the required photograph 256d further illustrates a full-length crop with a no smile facial expression and a one-knee on a chair prop pose. In the example shown, the required photograph 256e further illustrates similar criteria as required photograph 256d, but with a full smile facial expression. In the example shown, the required photograph 256f further illustrates similar criteria as required photograph 256e, but with a three-quarter length crop and no chair prop.

Figure 12:
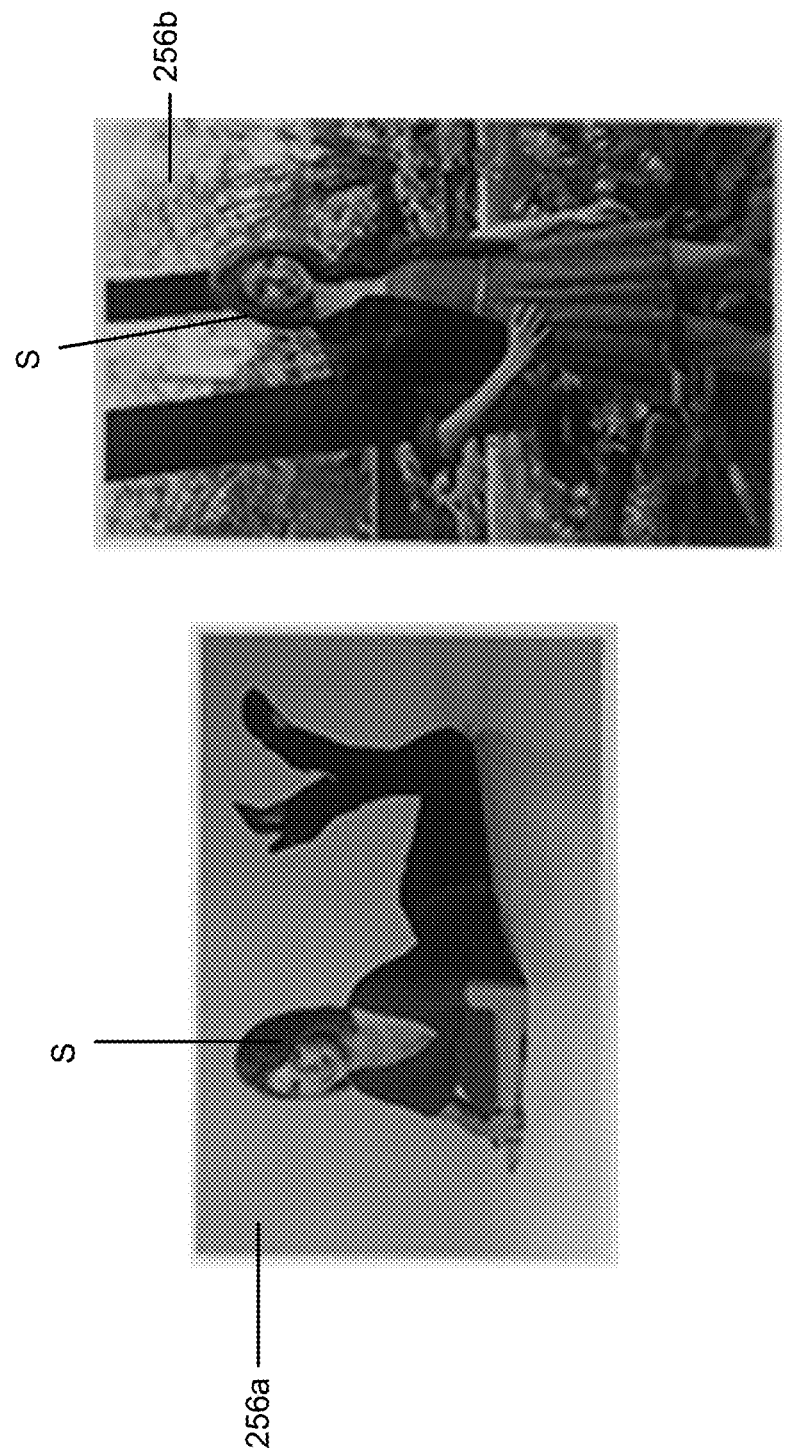
FIG. 12 is a schematic diagram of example required photographs captured during a photography session for a particular photography portrait order specification.

FIG. 12 is a schematic diagram of example required photographs 256 captured during a photography session 430 for a particular photography portrait order specification. In the illustrated example, the required photographs 256a-b were captured during the photography session 430. The required photographs 256a-b illustrate certain required criteria.

In the example shown, the required photograph 256a illustrates a full-length crop, a full smile facial expression, a landscape image including a horizontal subject orientation, and a laying-down, casual pose.

In the example shown, the required photograph 256b further illustrates a three-quarter crop and a portrait image including a vertical subject orientation.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system comprising:
a display;
a processor; and
a memory storing instructions that, when executed by the processor, cause the system to:
generate and provide a user interface for presentation via the display, the user interface comprising a session status report that includes a list of photographs to be captured in a photography session and associated indicators to visually indicate whether the photographs have been captured;
receive an image of a human subject comprising at least one face captured by a camera;
evaluate the image to determine whether the image meets criteria of at least one photograph of the photographs to be captured, wherein the criteria is at least one of a facial expression or a pose;
in response to a determination that the image meets the criteria of the at least one photograph, update the session status report presented via the display, the update including an update to the associated indicator of the at least one photograph in the list to visually indicate that the at least one photograph has been captured;
in response to the session status report being updated, generate and provide a view within the user interface for presentation via the display, the view comprising the image and one or more selectable controls to enable confirmation of whether the image meets the criteria of the at least one photograph; and
receive a selection of one of the selectable controls that indicates whether the image meets the criteria of the at least one photograph.

2. The system of claim 1, wherein the session status report further includes criteria for each photograph in the list of photographs.

3. The system of claim 1, wherein the system is caused to update the session status report to further include a preview of the image in association with the at least one photograph in the list.

4. The system of claim 1, wherein when the system receives one or more additional images captured by the camera that, upon evaluation, are determined to meet the criteria of the at least one photograph, the system is further caused to determine a ranking for the image and the one or more additional images.

5. The system of claim 4, wherein the system is caused to update the session status report to further include an identifier of the ranking for each of the image and the one or more additional images in association with the at least one photograph in the list.

6. The system of claim 4, wherein the system is caused to update the session status report to further include a preview of the highest ranking image in association with the at least one photograph in the list.

7. The system of claim 4, wherein to determine the ranking for the image and the one or more additional images, the system is caused to:
for each of the image and the one or more additional images,
detect features of the respective image corresponding to the criteria of the at least one photograph;
determine a level of quality for each of the detected features; and
aggregate the level of quality determined for each of the detected features to generate a quality score; and
compare the quality score generated for each of the image and the one or more additional images to determine the ranking for the image and the one or more additional images.

8. The system of claim 7, wherein the level of quality determined for one or more of the detected features is weighted.

9. The system of claim 7, wherein the system is caused to update the session status report to further include an identifier of each of the image and the one or more additional images that exceeds one or more of a threshold ranking, a threshold level of quality, or a threshold quality score, the identifier displayed in association with the at least one photograph in the list.

10. The system of claim 1, wherein the system is caused to update the session status report to further include one or more of an identifier and a preview of the image in association with the at least one photograph in the list, and the view is generated and provided in response to a selection of the one or more of the identifier or the preview of the image.

11. The system of claim 1, wherein responsive to receiving one or more additional images that, upon evaluation, are determined to meet the criteria of the at least one photograph, the view comprises each of the image and the one or more additional images in a single view.

12. The system of claim 1, wherein the system is further caused to:
in response to receiving a selection of one of the selectable controls that indicates the image does not meet the criteria of the at least one photograph, reversing the update to the associated indicator of the at least one photograph in the list to visually indicate that the at least one photograph has not been captured.

13. The system of claim 1, wherein the system is a mobile computing device, the camera is a camera of the mobile computing device, and the display is a screen of the mobile computing device.

14. A method comprising:
generating a user interface for display during a photography session, the user interface comprising a session status report that includes a list of photographs to be captured in the photography session and associated indicators to visually indicate whether the photographs have been captured;
receiving an image of a human subject comprising at least one face captured by a camera;
evaluating the image to determine whether the image meets criteria of at least one photograph of the photographs to be captured, wherein the criteria is at least one of a facial expression or a pose;
in response to a determination that the image meets the criteria of the at least one photograph, updating, within the session status report, the associated indicator of the at least one photograph in the list to visually indicate that the at least one photograph has been captured
in response to the session status report being updated, generating and providing a view within the user interface, the view comprising the image and one or more selectable controls to enable confirmation of whether the image meets the criteria of the at least one photograph; and
receiving a selection of one of the selectable controls that indicates whether the image meets the criteria of the at least one photograph.

15. The method of claim 14, wherein evaluating the image further comprises:
detecting one or more features of the image;
determining whether the one or more features of the image are associated with the criteria of the at least one photograph of the photographs to be captured during the photography session; and
determining a level of quality of each of the one or more features of the image determined to be associated with the criteria of the at least one photograph.

16. The method of claim 14, further comprising:
during the photography session, determining that images meeting criteria of one or more photographs from the list of photographs have not been captured; and
in response to the determination, displaying a prompt to capture images that meet the criteria of the one or more of photographs in order to complete the photography session.

17. The method of claim 14, further comprising:
receiving a photograph specification that includes the photographs to be captured during the photography session and criteria of each of the photographs; and
generating the session status report based on the received photograph specification.

18. The method of claim 17, wherein receiving the photograph specification comprises:
displaying a plurality of photograph specifications, including the photograph specification, in the user interface; and
receiving a selection of the photograph specification via the user interface.

19. A computer readable storage medium storing instructions that, when executed by a processor, cause the processor to:
generate a user interface for display, the user interface comprising a session status report that includes a list of photographs of a human subject comprising at least one face to be captured in a photography session and associated indicators to visually indicate whether the photographs have been captured;
in response to a determination that an image captured in the photography session meets criteria of at least one photograph of the photographs to be captured, update, within the displayed session status report, the associated indicator of the at least one photograph in the list to visually indicate that the at least one photograph has been captured, wherein the criteria is at least one of a facial expression or a pose;
in response to the session status report being updated, generate and provide a view within the user interface, the view comprising the image and one or more selectable controls to enable confirmation of whether the image meets the criteria of the at least one photograph; and
receive a selection of one of the selectable controls that indicates whether the image meets the criteria of the at least one photograph.

\* \* \* \* \*